(12) United States Patent
Shevelow et al.

(10) Patent No.: US 11,621,508 B2
(45) Date of Patent: Apr. 4, 2023

(54) FLAT FLEXIBLE CONDUCTIVE FLUID CRIMP CONNECTOR

(71) Applicant: Pica Product Development, LLC, Derry, NH (US)

(72) Inventors: Richard Shevelow, Estero, NH (US); Scott Stapleford, Derry, NH (US); Mark Pare, Derry, NH (US)

(73) Assignee: PICA Product Development LLC, Derry, NH (US)

( * ) Notice: Subject to any disclaimer, the term of this patent is extended or adjusted under 35 U.S.C. 154(b) by 0 days.

(21) Appl. No.: 17/643,918

(22) Filed: Dec. 13, 2021

(65) Prior Publication Data

US 2022/0224029 A1 Jul. 14, 2022

Related U.S. Application Data

(63) Continuation-in-part of application No. PCT/US2020/037657, filed on Jun. 14, 2020.

(51) Int. Cl.
*H01R 12/67* (2011.01)
*G01M 3/16* (2006.01)

(52) U.S. Cl.
CPC ............ *H01R 12/67* (2013.01); *G01M 3/165* (2013.01); *H01R 2201/20* (2013.01)

(58) Field of Classification Search
CPC .... H01R 12/67; H01R 2201/20; G01M 3/165
See application file for complete search history.

(56) References Cited

U.S. PATENT DOCUMENTS

| | | | | |
|---|---|---|---|---|
| 3,395,381 A | * | 7/1968 | Huffnagle | H01R 12/68 439/492 |
| 3,612,744 A | | 10/1971 | Thomas | |
| 4,082,402 A | * | 4/1978 | Kinkaid | H01R 4/2495 439/877 |

(Continued)

FOREIGN PATENT DOCUMENTS

| | | |
|---|---|---|
| CN | 203277846 U | 11/2013 |
| CN | 204313883 U | 5/2015 |

(Continued)

OTHER PUBLICATIONS

PCT International Search Report and Written Opinion of the International Searching Authority for International Application No. PCT/US2020/037657, dated Sep. 4, 2020.

*Primary Examiner* — Jean F Duverne

(57) ABSTRACT

Described embodiments provide a crimp connector with hooks to hold a flat flexible cable (FFC). The crimp connector includes a bottom body and multiple hooks protruding outward from and coupled to the bottom body to hold the FFC. The crimp connector also includes a top clasp hingably mounted to the bottom body having multiple barbs internally mounted therein. Each of the barbs correspond with an uninsulated flat conductor of the FFC. In response to the top clasp engaging with the bottom body such that a slotted wedge of the top clasp presses the corresponding one of the first and second uninsulated flat conductors against the corresponding barbs, the crimp connector makes an electrical connection between each of the barbs and the corresponding one of first and second uninsulated flat conductors.

15 Claims, 4 Drawing Sheets

(56) References Cited

U.S. PATENT DOCUMENTS

| | | | |
|---|---|---|---|
| 4,124,265 A * | 11/1978 | Turk | H01R 13/112 |
| | | | 439/403 |
| 4,374,379 A | 2/1983 | Dennison, Jr. | |
| 4,843,305 A | 6/1989 | Akiba | |
| 4,859,204 A * | 8/1989 | Daly | H01R 12/68 |
| | | | 439/422 |
| 4,900,268 A | 2/1990 | Kunishi | |
| 6,089,904 A | 7/2000 | Wu | |
| 6,175,310 B1 | 1/2001 | Gott | |
| 6,443,758 B2 | 9/2002 | Nagai | |
| 6,505,509 B2 | 1/2003 | Gualtieri | |
| 6,526,807 B1 | 3/2003 | Doumit et al. | |
| 7,292,155 B2 | 11/2007 | Vokey et al. | |
| 7,295,126 B2 | 11/2007 | Stackelhouse | |
| 7,338,310 B2 | 3/2008 | Kumakura | |
| 8,262,250 B2 | 9/2012 | Li et al. | |
| 8,714,772 B1 | 5/2014 | Levante et al. | |
| 8,872,032 B2 | 10/2014 | Lin et al. | |
| 2001/0035048 A1 | 11/2001 | Gualtieri | |
| 2006/0286848 A1 | 12/2006 | Kumakura | |
| 2013/0069675 A1 | 3/2013 | Woloszyk | |
| 2017/0003192 A1 | 1/2017 | Ling et al. | |

FOREIGN PATENT DOCUMENTS

| | | |
|---|---|---|
| CN | 206504834 U | 9/2017 |
| CN | 207069116 U | 3/2018 |
| CN | 207303424 U | 5/2018 |
| EP | 1524726 A1 | 4/2005 |
| EP | 1533871 A2 | 5/2005 |
| JP | 7-23514 A | 6/1993 |
| JP | H09115573 A | 5/1997 |
| JP | H09293571 A | 11/1997 |
| JP | 4090060 B2 | 5/2008 |
| JP | 4098290 B2 | 6/2008 |
| KR | 100424843 B1 | 3/2004 |
| KR | 20100138523 A | 12/2010 |

* cited by examiner

FLAT FLEXIBLE CONDUCTIVE FLUID CRIMP CONNECTOR

CROSS-REFERENCE TO RELATED APPLICATIONS

This application is a continuation-in-part, and claims the benefit of the filing date, of co-pending international application no. PCT/US20/37657, filed on Jun. 14, 2020, and entitled "Conductive Fluid Sensor Cable", the teachings of which are incorporated herein by reference in their entireties.

BACKGROUND

Water and other fluid leaks can cause significant damage to property, and it is important to detect such leaks to prevent damage. To detect leaks, moisture and fluid sensors may be used. Various moisture and fluid sensor systems that are available on the market generally include a pair of electrical probes that conduct current when both probes contact a continuous body of conducting fluid, a conductive fluid sensing circuit, a notification system, as well as a relay which turns off a water supply and/or turns on a pump when conductive fluid is detected. Additionally, a cable may be used in the conductive fluid sensing system to help sense fluids. The cable couples to the conductive fluid sensing circuit of the system using a connector such as crimp connector. One type of cable that may be used is a flat flexible cable (FFC). The crimp connector should allow for the FFC to connect with the conductive fluid sensing circuit in order for the system to properly function.

However, currently available crimp connectors may not optimally engage with the FFC. Further, extending the length of a cable by attaching another cable may be desired. Therefore, an improved connector for use with a conductive fluid sensing system for detecting conductive fluid leaks is desired.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

One aspect provides a crimp connector with hooks to hold a flat flexible cable (FFC). The crimp connector comprises a bottom body and a plurality of hooks coupled to the bottom body. The plurality of hooks protrude outward from the bottom body and are configured to hold the FFC. The crimp connector further comprises a top clasp hingably mounted to the bottom body having a plurality of barbs internally mounted therein. Each of the plurality of barbs are configured to correspond with an uninsulated flat conductor of the FFC. The crimp connector is configured to make an electrical connection between each of the plurality of barbs and the corresponding one of first and second uninsulated flat conductors in response to the top clasp engaging with the bottom body such that a slotted wedge of the top clasp presses the corresponding one of the first and second uninsulated flat conductors against the corresponding barbs.

BRIEF DESCRIPTION OF THE DRAWING FIGURES

Aspects, features, and advantages of the concepts, systems, circuits and techniques described herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. Furthermore, the drawings are not necessarily to scale, emphasis instead being placed on the concepts disclosed herein.

DETAILED DESCRIPTION

Figure 1A:
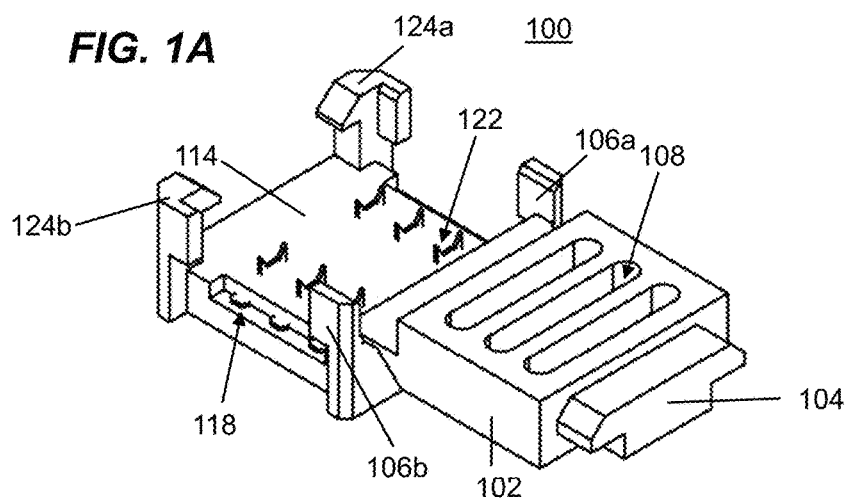
FIGS. 1A-1G are top isometric, top, bottom, right, front, rear, and bottom isometric views of a flat cable crimp connector assembly in an open configuration, in accordance with described embodiments.
Figures 1B, 1C:
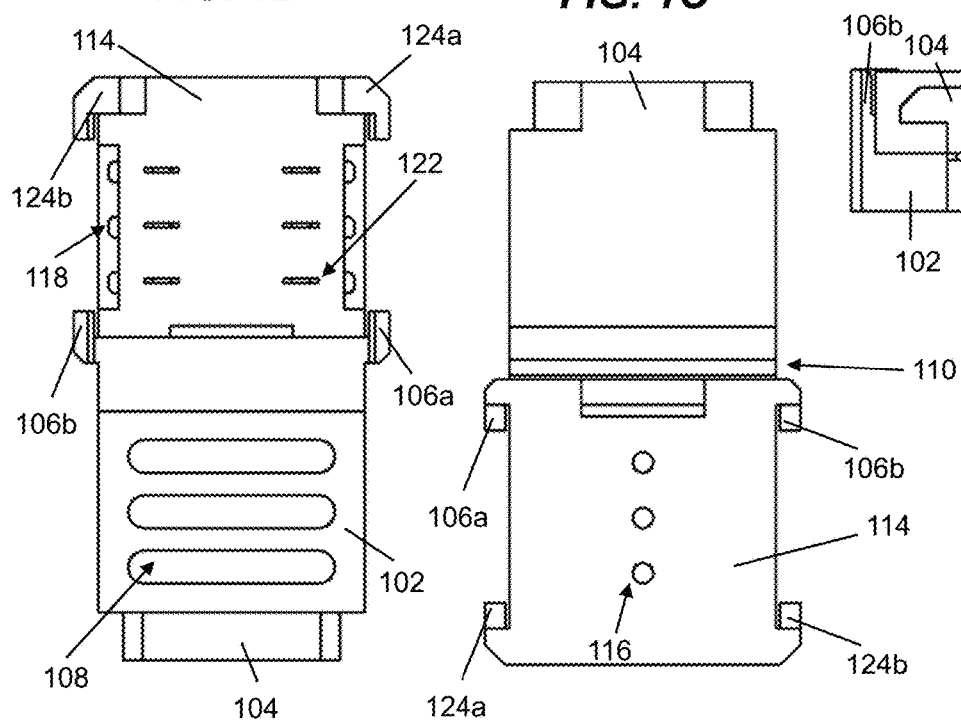
Figure 1D:
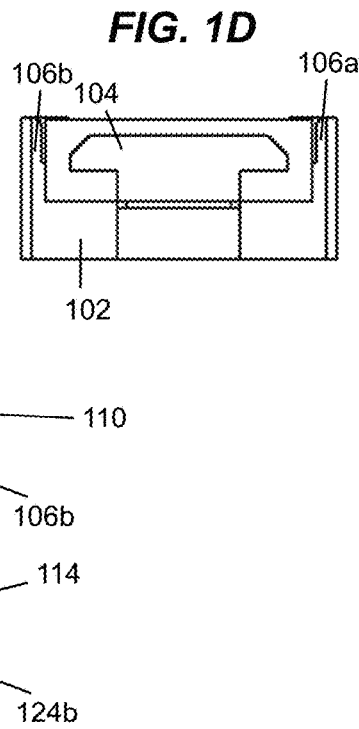

Described embodiments provide a crimp connector to hold and couple a cable such as a FFC to a conductive fluid sensing circuit of a conductive fluid sensing system used to detect the presence of a fluid. Therefore, the crimp connector should permit for electric current to flow between the FFC and the circuit.

The crimp connector includes a bottom body and multiple hooks protruding outward from and coupled to the bottom body to hold the FFC. The crimp connector also includes a top clasp hingably mounted to the bottom body having multiple barbs internally mounted therein. Each of the barbs correspond with an uninsulated flat conductor of the FFC. In response to the top clasp engaging with the bottom body such that a slotted wedge of the top clasp presses the corresponding one of the first and second uninsulated flat conductors against the corresponding barbs, the crimp connector makes an electrical connection between each of the barbs and the corresponding one of first and second uninsulated flat conductors.

The conductive fluid sensing system that is to be coupled to a conductive fluid sensor cable is not depicted. However, it is to be understood that the crimp connector described herein is to engage with the cable in order to allow for electric current to flow between the crimp connector and the cable to be coupled to the conductive fluid sensing system. Additional details regarding the conductive fluid sensing system and its components can be found in the Patent Cooperation Treaty (PCT) International Patent Application No. PCT/US20/37657, filed on Jun. 14, 2020, and entitled "Conductive Fluid Sensor Cable" which is co-owned by same assignee as this patent application, and to which this application claims priority. The terms FFC and cable are interchangeably used.

Referring now to the figures, FIGS. 1A-1G and 2A-2G depict the crimp connector. FIGS. 1A-1G are top isometric, top, bottom, right, front, rear, and bottom isometric views of a flat cable crimp connector assembly in an open configuration, and FIGS. 2A-2G are top isometric, top, bottom, right, front, rear, and bottom isometric views of the flat cable crimp connector assembly in a closed configuration. As shown in the various FIG. 1 and FIG. 2 embodiments, crimp connector 100 may have a top clasp 102 connected to a bottom body 114 via a snap close assembly 110. Top clasp 102 may hinge to engage with bottom body 114 via snap close assembly 110. Top clasp 102 includes a latch 104, which interacts with an edge of bottom body 114 when snapped closed. Snap close assembly 110 allows top clasp 102 to overlap bottom body 114 when top clasp 102 is placed on top of bottom body 114 when top clasp 102 is moved in a counterclockwise direction (see FIG. 1E). FIGS. 2A-2G depict the closed configuration.

Figure 1E:
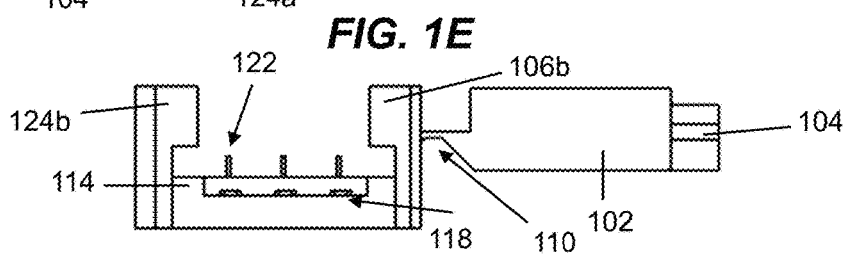
Figure 1F:
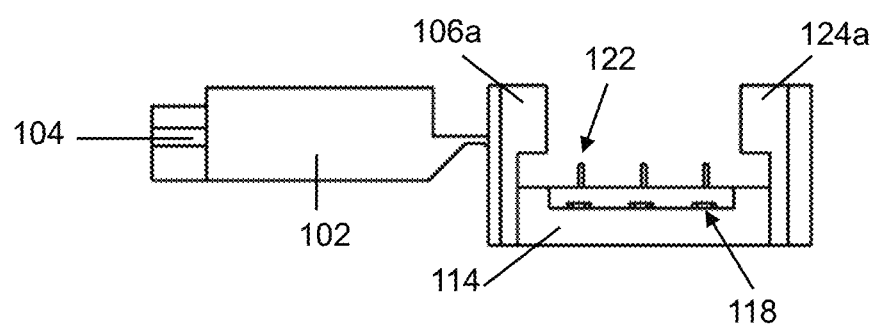
Figure 1G:
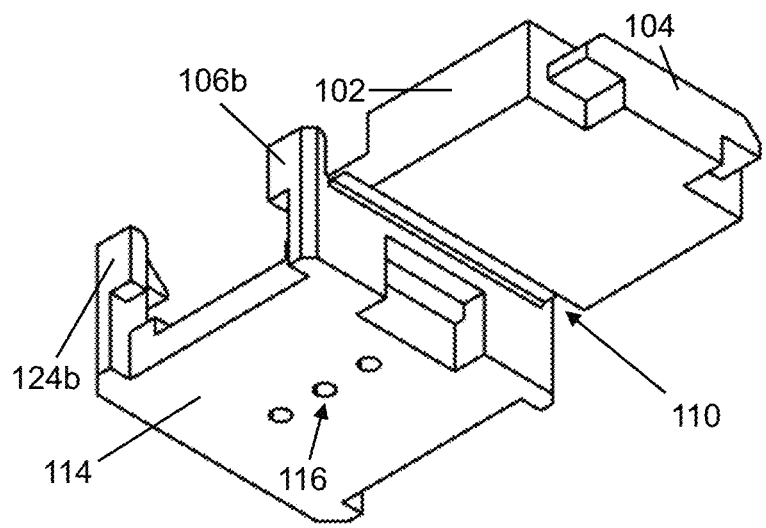
Figure 2A:
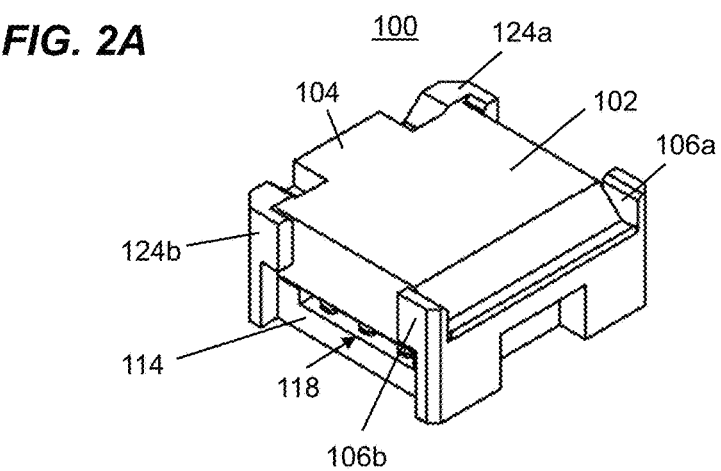
FIGS. 2A-2G are top isometric, top, bottom, right, front, rear, and bottom isometric views of a flat cable crimp connector assembly in a closed configuration, in accordance with described embodiments.
Figures 2B, 2C, 2D:
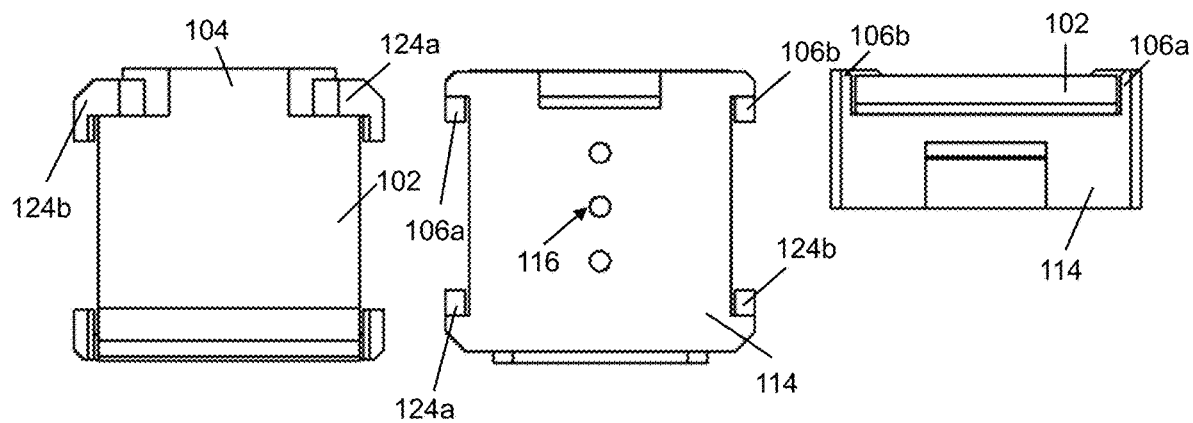
Figure 2E:
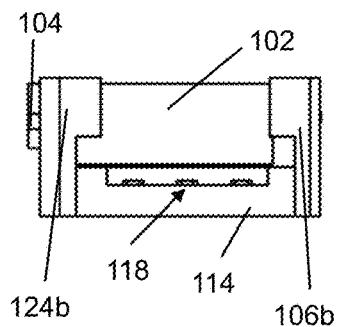
Figure 2F:
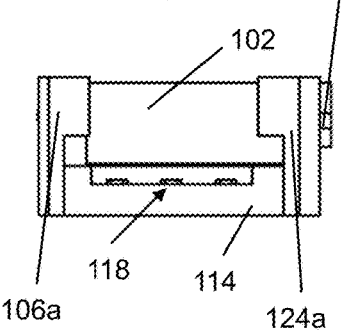
Figure 2G:
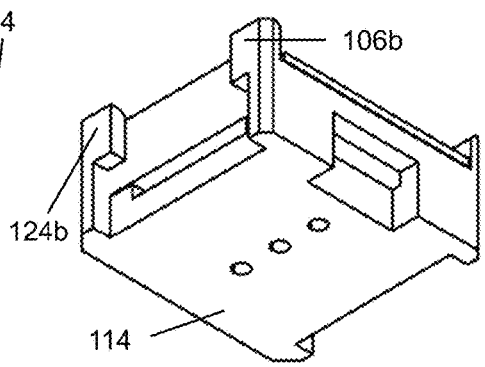

Snap close assembly 110 may be constructed of a material that can allow for bending and/or flexing. For example, as depicted in FIG. 1E, snap close assembly 110 may be constructed of a material that may permit top clasp 102 to be rotated in a counterclockwise direction to engage with bottom body 114 in a closed configuration (as depicted in FIGS. 2A-2G). To return to the open configuration, latch 104 may disengage from front hooks 124a and 124b (e.g., by applying pressure onto latch 104 and pulling latch 104 in a clockwise direction away from front hooks 124a and 124b) and top clasp 102 may be moved in a clockwise direction such that is it placed in the position depicted in FIG. 1E. The latch is configured to removably release from the first front hook and the second front hook in the open configuration. Thus, snap close assembly 110 may permit movement of top clasp 102 in both clockwise and counterclockwise directions to place the crimp connector 100 in open and closed configurations.

In the depicted embodiment, snap close assembly 110 may be a flexible hinge assembly that does not use external screws. In other embodiments (not depicted), instead of using a flexible hinge snap close assembly, other assemblies that allow for the hinge-like movement of top clasp 102 to engage with bottom body 114 may be used. For example, a hinge screw assembly, a spring-loaded closing mechanism, or other mechanisms may be used.

Crimp connector 100 also includes a set of hooks, rear hooks 106a, 106b and front hooks 124a, 124b. Latch 104 of top clasp 102 interacts with an edge of a bottom body 114 and front hooks 124a and 124b when snapped closed. Specifically, when top clasp 102 closes and interacts with bottom body 114 (as a result of bending snap close assembly 110 so that crimp connector is placed in a closed configuration), the beveled edges of latch 104 may snap, tightly fit by tension, connect using a hook and loop connection, or otherwise engage or lock onto front hooks 124a and 124b. Thus, front hooks 124a and 124b may be constructed in a way to tightly fit with latch 104 when top clasp 102 engages with the top surface of bottom body 114.

Rear hooks 106a, 106b and front hooks 124a, 124b may be coupled to bottom body 114. In an embodiment, rear hooks 106a, 106b and front hooks 124a, 124b may be permanently or removably affixed to bottom body 114. In other implementations, any one or more of rear hooks 106a, 106b or front hooks 124a, 124b may constructed as a part of bottom body 114. For example, any one or more of rear hooks 106a, 106b or front hooks 124a, 124b may be constructed as part of the same mold as bottom body 114. Therefore, reference to rear hooks 106a, 106b and front hooks 124a, 124b being coupled to bottom body may encompass any type of arrangement described above or known variations.

As depicted, rear hooks 106a, 106b and front hooks 124a, 124b protrude outward from the bottom body (e.g., protrude outward along a vertical direction of the embodiment shown in FIG. 1E) in order to guide the cable. Thus, the hooks (106a, 106b, 124a, and 124b) may be strategically placed in areas in the front and rear of bottom body 114 in order to guide and properly place the cable onto the crimp connector 100. Hooks 106a, 106b, 124a, and 124b may allow for reception, retention and electrical connection of the cable to the crimp connector (which may be further coupled to a conductive fluid sensing circuit of a conductive fluid sensing system). The crimp connector may allow the cable to be inserted, and then later removed, to allow the cable to be easily installed and replaced without needing to open the housing of the conductive fluid sensing circuit and/or solder the connections.

In an embodiment, the distance between the front hooks and rear hooks may be the same as or be wide enough to fit the width of the cable. Thus, the distance between the front hooks and rear hooks may be substantially similar to the width of the cable and therefore, once the cable is guided through the hooks, the cable is securely placed therein and may not slide out of crimp connector 100. The hooks may guide and securely allow for proper placement of the cable to avoid the cable from slipping out of the crimp connector when in a closed configuration.

In another embodiment, the distance between the front hooks and rear hooks may substantially similar the width of the cable plus a small relative tolerance to allow for loose insertion and fit, yet tight enough that a cable being inserted therein is naturally guided by, and substantially centered between, the inner sidewalls of the hooks.

As described above, front hooks 124a and 124b have a beveled edge on top to engage with latch 104 (see FIGS. 1A, 1B-1D and 1G). Additionally, front hooks 124a and 124b have side indentations constructed to fit the sides of latch 104. The height of the hooks may allow for top clasp 102 to fit onto bottom body 114 and leave enough space for the FFC to be placed in between top clasp 102 and bottom body 114 when in a closed configuration. The bottom of the hooks may be flush with bottom body 114 so that crimp connector 100 may be placed in a stable position on top of a surface.

FIGS. 2A-2G depict the crimp connector in a closed configuration. A cable such as a FFC may be placed at the surface of bottom body 114 by being guided through the hooks (106a, 106b, 124a, and 124b). When top clasp 102 is closed (by moving top clasp 102 via snap close assembly 110), front hooks 124a and 124b may engage with latch 104 such that top clasp 102 stays closed and slotted cable wedge 108 of top clasp 102 firmly presses the cable (not shown) against teeth 122 of the internal cable barbs (not viewable in the figures as the internal cable bars are internally mounted in a layer between the top surface layer and the bottom layer of bottom body 114). Each of the internal cable barbs may be coupled to (or be a contiguous part of) of connector pins 118 (which are exposed and viewable, as depicted in the figures).

Each of the internal cable barbs may correspond to a given one of the conductors in the cable to be crimped. The cable may be placed onto the surface of bottom body 114 and guided along the hooks. When top clasp 102 is latched in place and crimp connector 100 is in a closed configuration (e.g., when front hooks 124a and 124b engage latch 104, see FIGS. 2A-2G), teeth 122 of the internal cable barbs may pierce the substrate and/or the fluid-permeable cover of cable 300, thereby establishing an electrical connection with the conductors of cable 300 (see FIGS. 3A and 3B). Additionally, in the closed configuration, the tops of each of hooks 106a, 106b, 124a, and 124b lay flush with top clasp 102.

Figure 3A:
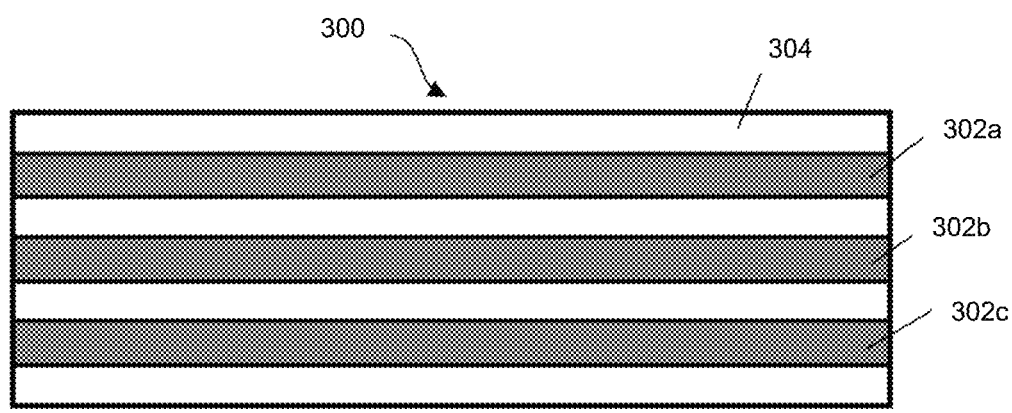
FIGS. 3A and 3B are top and side views of a flat flexible cable having three conductors, in accordance with described embodiments.
Figure 3B:
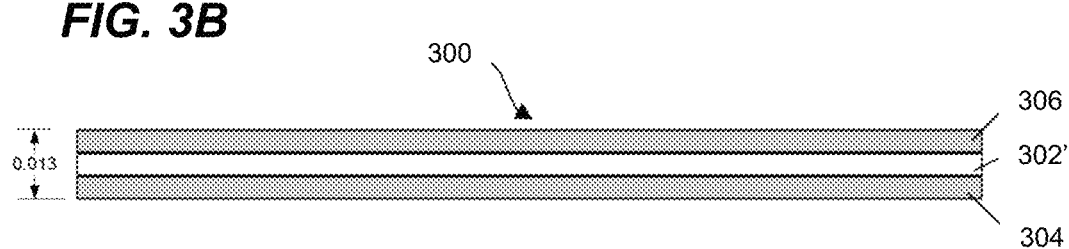

An exemplary FFC that may be placed on crimp connector 100 is depicted in FIGS. 3A and 3B.

FIGS. 3A and 3B depict one embodiment of an exemplary cable 300 may include three conductors, 302a, 302b, and 302c. In an embodiment, any two of the conductors 302 may be coupled together by a jumper (not shown), and the other conductor 302 may remain electrically isolated from the other two conductors. In such an arrangement, a break in cable 300 could be detected (e.g., by a conductive fluid sensing system (not shown)), since coupling two of the conductors 302 together would form a current path circuit that originates from and returns to a conductive fluid sensing system (not shown). If cable 300 were broken, the circuit path formed by the coupled conductors 302 would also be broken. Having a third, electrically isolated conductor would also allow for a conductive fluid to form a current path between one or both of the coupled conductors and the electrically isolated conductor, thereby providing fluid sensing capabilities in addition to sensing a broken cable. Other numbers of conductors may be envisioned for other beneficial purposes.

FIG. 3B shows a side view of cable 300 that includes a substrate 304 (and optionally an adhesive layer (not shown)), a conductive layer 302', and a cover layer 306. In some embodiments, the entire thickness of cable 300 might be approximately 0.013 inches, and the width of cable 300 might be approximately 0.4 inches. In some embodiments, conductive layer 302' might be approximately 0.003 inches and each conductor 302a, b, c, might be approximately 0.062 inches in width, and each conductor may be separated by a gap of approximately 0.038 inches. In some embodiments, substrate 304 may be a layer which might include polyester having a thickness of approximately 0.001 inches and adhesive having a thickness of approximately 0.0015 inches.

Cable 300 may include at least two or more uninsulated flat conductors (any two of 302a, 302b, and 302c). Referring again to FIGS. 1A-1G and 2A-2G, crimp connector 100 is able to make an electrical connection between each of the barbs and the corresponding one of uninsulated flat conductors in response to top clasp 102 engaging with bottom body 114 such that slotted wedge 108 of the top clasp 102 presses the corresponding one of the first and second uninsulated flat conductors against the corresponding barbs. Thus, an electrical connection between corresponding ones of the conductors and corresponding ones of connector pins is ensured by the fitted connection between top clasp 102 and bottom body 114.

Although the depicted embodiment shows three connector pins which may engage with up to three conductors of a cable, any number of conductors and/or connector pins may be employed.

Each of the internal cable barbs may be coupled to (or be a contiguous part of) of connector pins 118 thereby allowing the cable conductors to be electrically coupled to a receptacle that receives connector pins 118 (e.g., a conductive fluid sensing system).

Bottom body 114 may include one or more holes or cavities 116. Although three cavities 116 are depicted, fewer (or non) or greater cavities may be included. Cavities 116 allow for Bottom body 114 also includes an opening slot towards the rear (see FIGS. 1E, 1G and 2G).

In an embodiment, the crimp connector comprises a zero-insertion force (ZIF) connector that is configured to receive an FFC cable. In such embodiment, the terminating end of the cable to be inserted into the ZIF connector will typically require a stiffener added to the end of the cable. In an embodiment, the stiffener preferably includes support tape such as polyethylene terephthalate (PET) or polyethylene naphthalate (PEN).

In an embodiment, the crimp connector may integrated into the circuitry and housing of the conductive fluid sensing circuit and may include features that allow an end of a cable to be inserted into and retained by the crimp connector, whereby the connector forms an electrical connection between conductors 302a, b, of cable 300 as well as the connector input nodes of the conductive fluid sensing circuit. The crimp connector may be self-contained and require no external crimping tool to electrically connect cable 300 to the conductive fluid sensing circuit. The crimp connector may be also not require any additional termination structure or support on the end of the cable—for example, the connector connects to a raw end of a cable wherein the raw end of the cable does not include any additional stiffener, connector, or other structure.

Although embodiments have been described for illustrative purposes, those skilled in the art will appreciate that various modifications, additions and substitutions are possible, without departing from the scope and spirit of the accompanying claims. For example, reference herein to "one embodiment" or "an embodiment" means that a particular feature, structure, or characteristic described in connection with the embodiment can be included in at least one embodiment of the claimed subject matter. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the words "exemplary" and "illustrative" are used herein to mean serving as an example, instance, or illustration. Any aspect or design described herein as "exemplary" or "illustrative" is not necessarily to be construed as preferred or advantageous over other aspects or designs. For purposes of this description, the terms "couple," "coupling," "coupled," "connect," "connecting," or "connected" refer to any manner known in the art or later developed in which energy is allowed to be transferred between two or more elements, and the interposition of one or more additional elements may be contemplated, although not required.

To the extent directional terms are used in the specification and claims (e.g., upper, lower, parallel, perpendicular, etc.), these terms are merely intended to assist in describing the embodiments and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

It will be further understood that various changes in the details, materials, and arrangements of the parts that have been described and illustrated herein might be made by those skilled in the art without departing from the scope of the following claims.

We claim:

1. A crimp connector with hooks to hold a flat flexible cable (FFC), the crimp connector comprising:
    a bottom body;
    a plurality of hooks coupled to the bottom body, the plurality of hooks protruding outward from the bottom body and configured to hold the FFC; and
    a top clasp hingably mounted to the bottom body having a plurality of barbs internally mounted therein, and each of the plurality of barbs configured to correspond with an uninsulated flat conductor of the FFC, wherein the crimp connector is configured to make an electrical connection between each of the plurality of barbs and the corresponding one of first and second uninsulated flat conductors in response to the top clasp engaging with the bottom body such that a slotted wedge of the top clasp presses the corresponding one of the first and second uninsulated flat conductors against the corresponding barbs, wherein each of the plurality of barbs are coupled to a corresponding one of a plurality of pins, the pins configured to be received in a connector of a conductive fluid sensing system to detect presence of a fluid.

2. The crimp connector of claim 1, wherein the plurality of hooks comprise at least two of a first front hook, a second front hook, a first rear hook, or a second rear hook.

3. The crimp connector of claim 2, wherein a distance between the first front hook and the first rear hook is substantially similar to a width of the FFC.

4. The crimp connector of claim 2, wherein the top clasp comprises a latch configured to engage with the first front hook and the second front hook.

5. The crimp connector of claim 4, wherein the latch comprises a beveled edge configured to lock onto edges of the first front hook and the second front hook.

6. The crimp connector of claim 2, wherein in response to the top clasp engaging with the bottom body, tops of the plurality of hooks lay flush with the top clasp.

7. The crimp connector of claim 1, wherein the top clasp is hingably mounted to the bottom body via a flexible hinge.

8. The crimp connector of claim 1, wherein the FFC further comprises a third uninsulated flat conductor, and wherein the crimp connector is further configured to make the electrical connection between one of each of the plurality of barbs and the third uninsulated flat conductor.

9. A crimp connector with hooks to hold a cable, the crimp connector comprising:

a bottom body;

a plurality of hooks comprising at least one of a first front hook, a second front hook, a first rear hook, or a second rear hook, each of the plurality of hooks coupled to the bottom body, and each of the plurality of hooks protruding outward from the bottom body and configured to guide the cable; and a top clasp comprising a latch, the top clasp hingably mounted to the bottom body having a plurality of barbs internally mounted therein, each of the plurality of barbs configured to correspond with an uninsulated flat conductor of the cable, wherein in response to the top clasp engaging with the bottom body, the crimp connector being in an closed configuration, wherein in the closed configuration, the crimp connector is configured to make an electrical connection between each of the plurality of barbs and the corresponding one of first and second uninsulated flat conductors such that a slotted wedge of the top clasp presses the corresponding one of the first and second uninsulated flat conductors against the corresponding barbs;

wherein the latch is configured to lock onto the first front hook and the second front hook in the closed configuration, wherein each of the plurality of barbs are coupled to a corresponding one of a plurality of pins, the pins configured to be received in a connector of a conductive fluid sensing system to detect presence of a fluid.

10. The crimp connector of claim 9, wherein the latch is configured to release from the first front hook and the second front hook in an open configuration.

11. The crimp connector of claim 9, wherein a distance between the first front hook and the first rear hook is substantially similar to a width of the cable.

12. The crimp connector of claim 11, wherein the latch comprises a beveled edge configured to lock onto edges of the first front hook and the second front hook.

13. The crimp connector of claim 9 wherein the top clasp is hingably mounted to the bottom body via a flexible hinge.

14. The crimp connector of claim 9, wherein in the closed configuration, tops of the plurality of hooks lay flush with the top clasp.

15. The crimp connector of claim 9, wherein the cable further comprises a third uninsulated flat conductor, and wherein the crimp connector is further configured to make the electrical connection between one of each of the plurality of barbs and the third uninsulated flat conductor.

* * * * *